United States Patent [19]

Fortune

[11] Patent Number: 5,683,603
[45] Date of Patent: Nov. 4, 1997

[54] ELECTRIC SOLDERING IRON TIP IMPROVEMENTS

[76] Inventor: William S. Fortune, 29866 Cuthbert Rd., Malibu, Calif. 90265

[21] Appl. No.: 424,161

[22] Filed: Apr. 19, 1995

[51] Int. Cl.$^6$ .................................................. H05B 3/42
[52] U.S. Cl. .............................................. 219/229; 228/55
[58] Field of Search ................................. 219/229–231, 219/233, 227, 238–239; 228/51, 55

[56] References Cited

U.S. PATENT DOCUMENTS

| | | | |
|---|---|---|---|
| 2,689,901 | 9/1954 | Obolensky | 219/230 |
| 2,751,484 | 6/1956 | Moon | 219/239 |
| 3,744,921 | 7/1973 | Weller et al. | 219/230 X |
| 4,562,838 | 1/1986 | Walker | 219/230 X |
| 5,422,457 | 6/1995 | Tang et al. | 219/238 |

Primary Examiner—Teresa J. Walberg
Assistant Examiner—Raphael Valencia
Attorney, Agent, or Firm—Daniel T. Anderson

[57] ABSTRACT

A soldering tip is disclosed which fits loosely over a ceramic heater rod. The rear skirt of the tip is slotted into segments the rear edges of which are tapered rearwardly inwardly to be engaged by a forwardly opening conical surface on the front of a metallic sheath covering and supporting the rear portion of the ceramic rod. When the soldering tip is urged rearwardly in its assembly to the remainder of the soldering tool the segmented portions of the skirt are then pressed radially inwardly over the ceramic rod. The slots dividing the skirt into segments extend well forwardly thereof whereby the bending of the segments is forwardly of the tip of the ceramic rod where a thermocouple type temperature sensor may be disposed. Thus the skirt portions make good thermal contact with the rear and central portions of the ceramic rod but not with the temperature sensor front tip portion. This causes some significant isolation of the temperature sensor from the heater driven skirt portions and causes it to be more responsive to the instantaneous temperature of the working portion of the soldering tip. This relationship and configuration provides an improvement in the temperature precision and power regulation of the tip portion of the soldering tool.

4 Claims, 6 Drawing Sheets

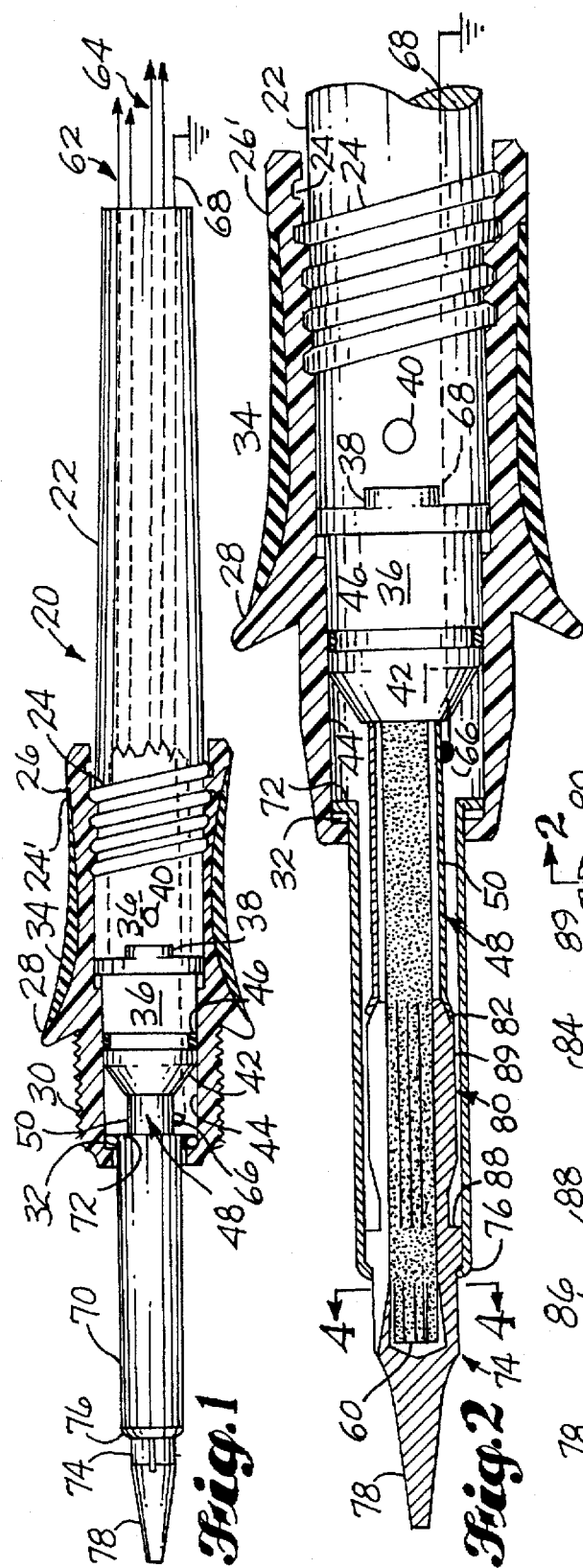
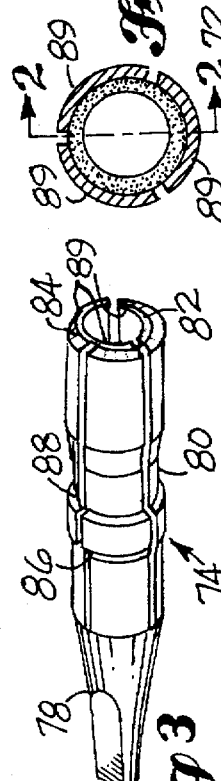
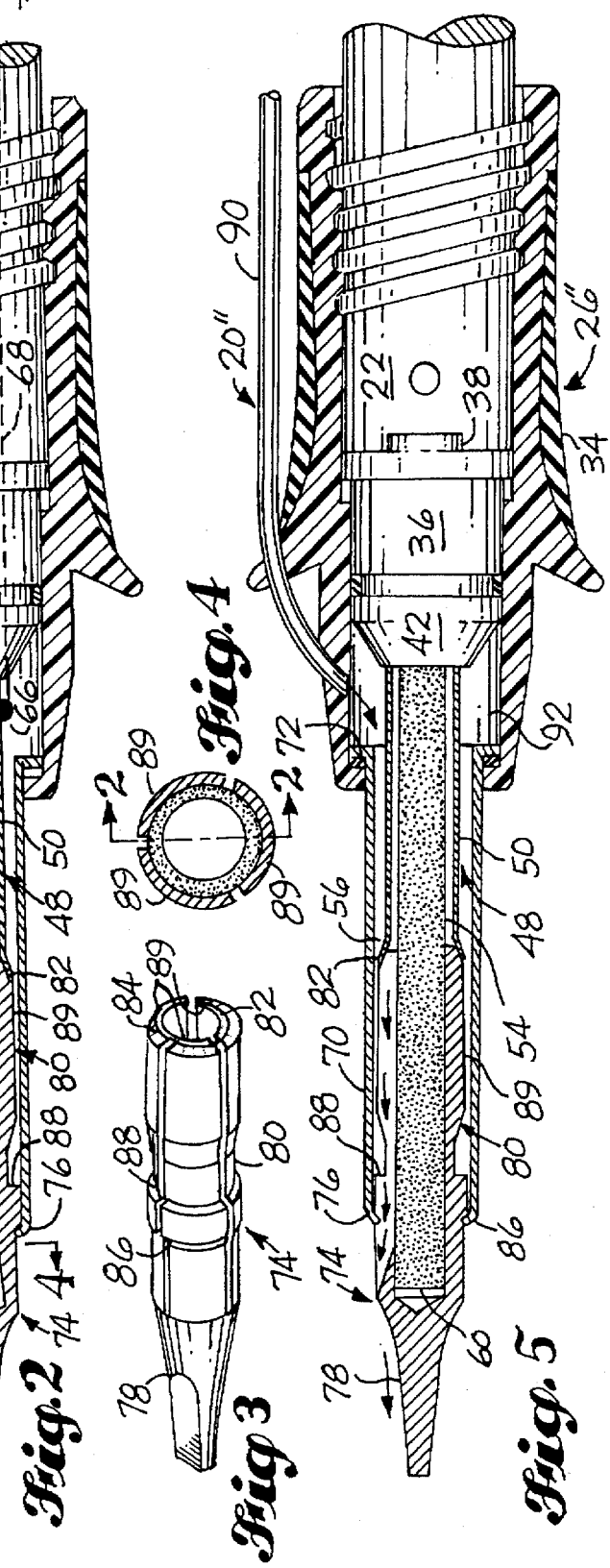

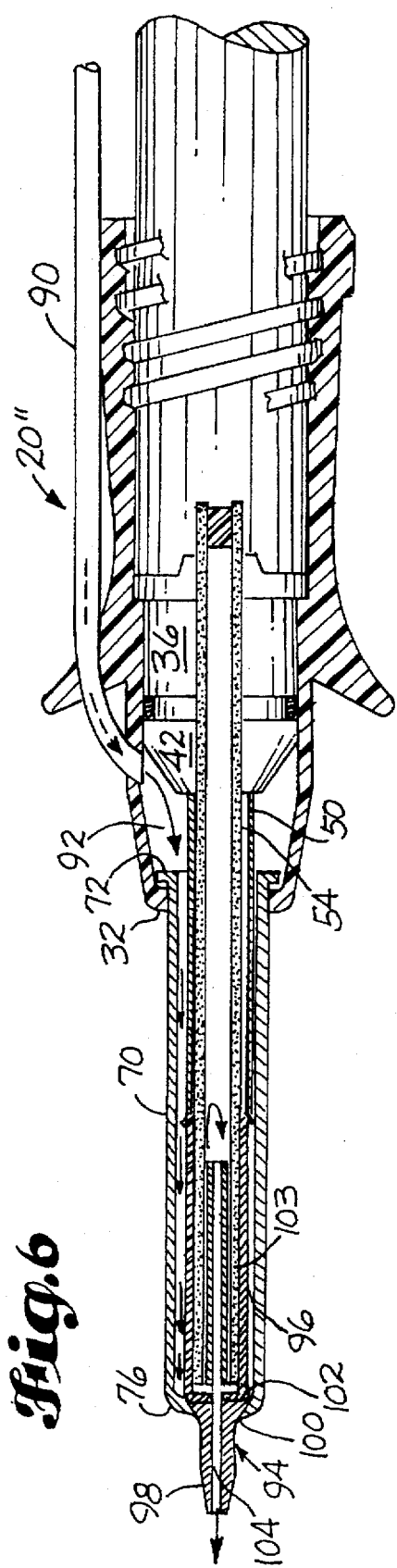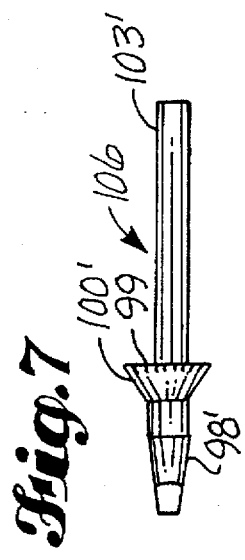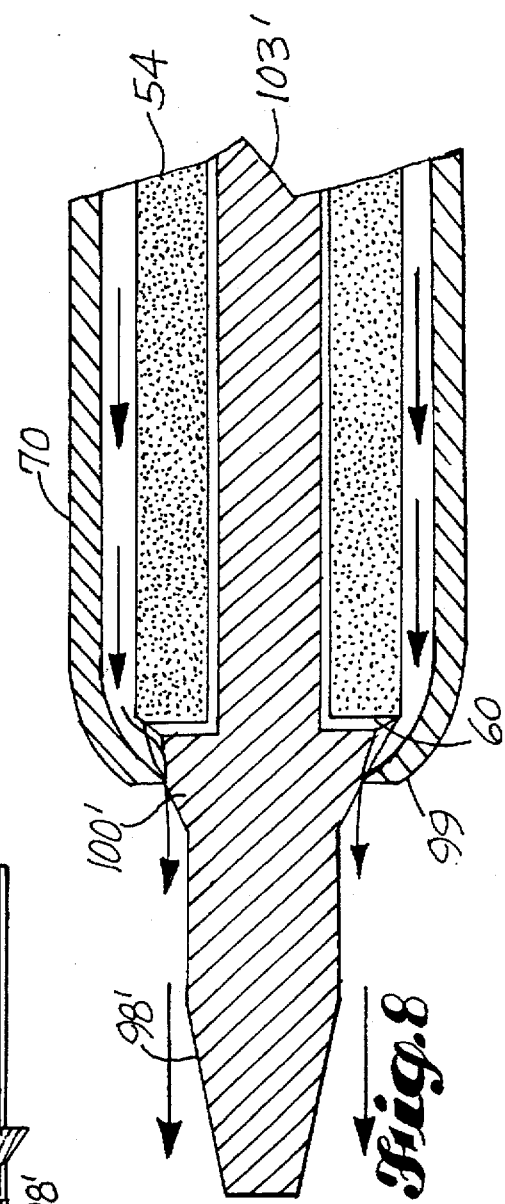

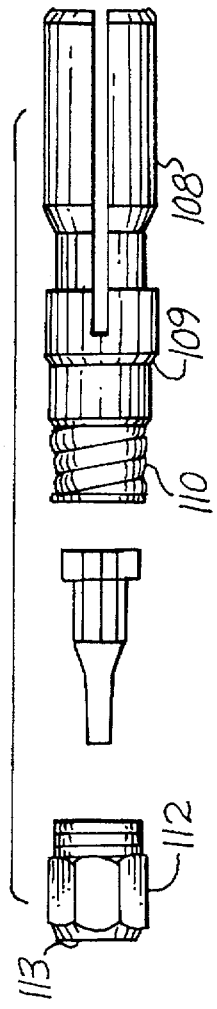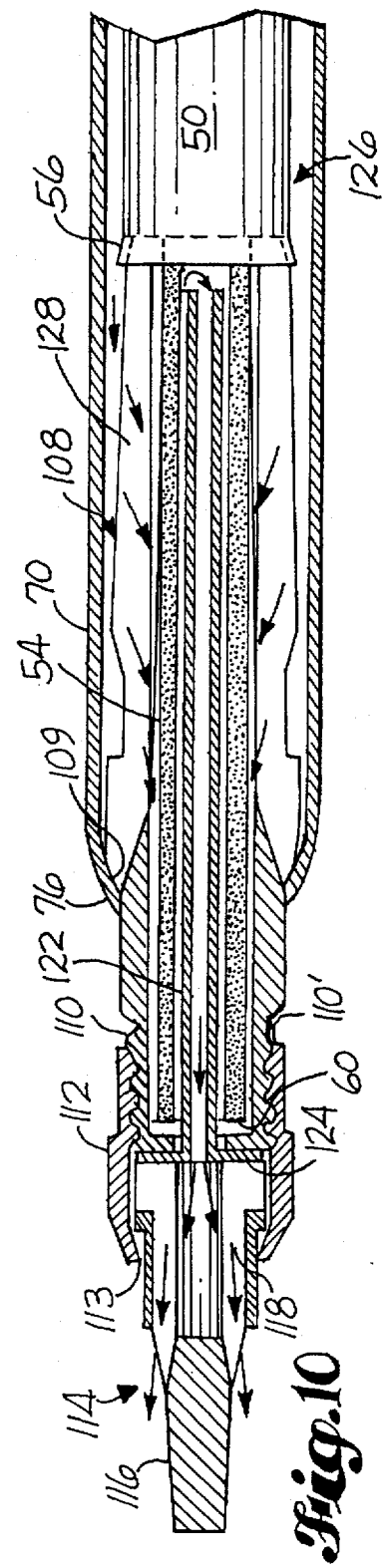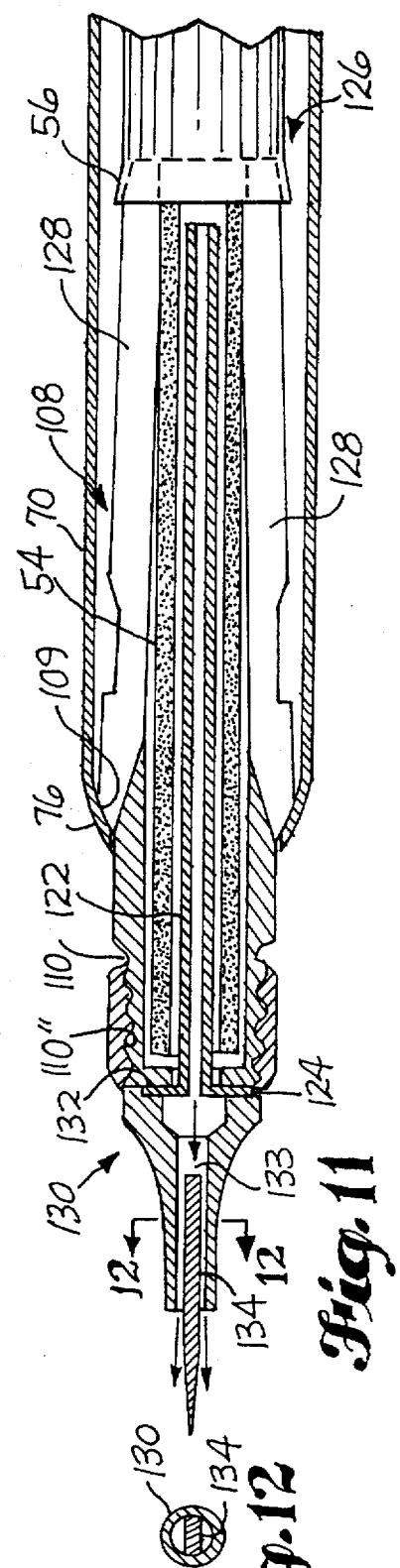

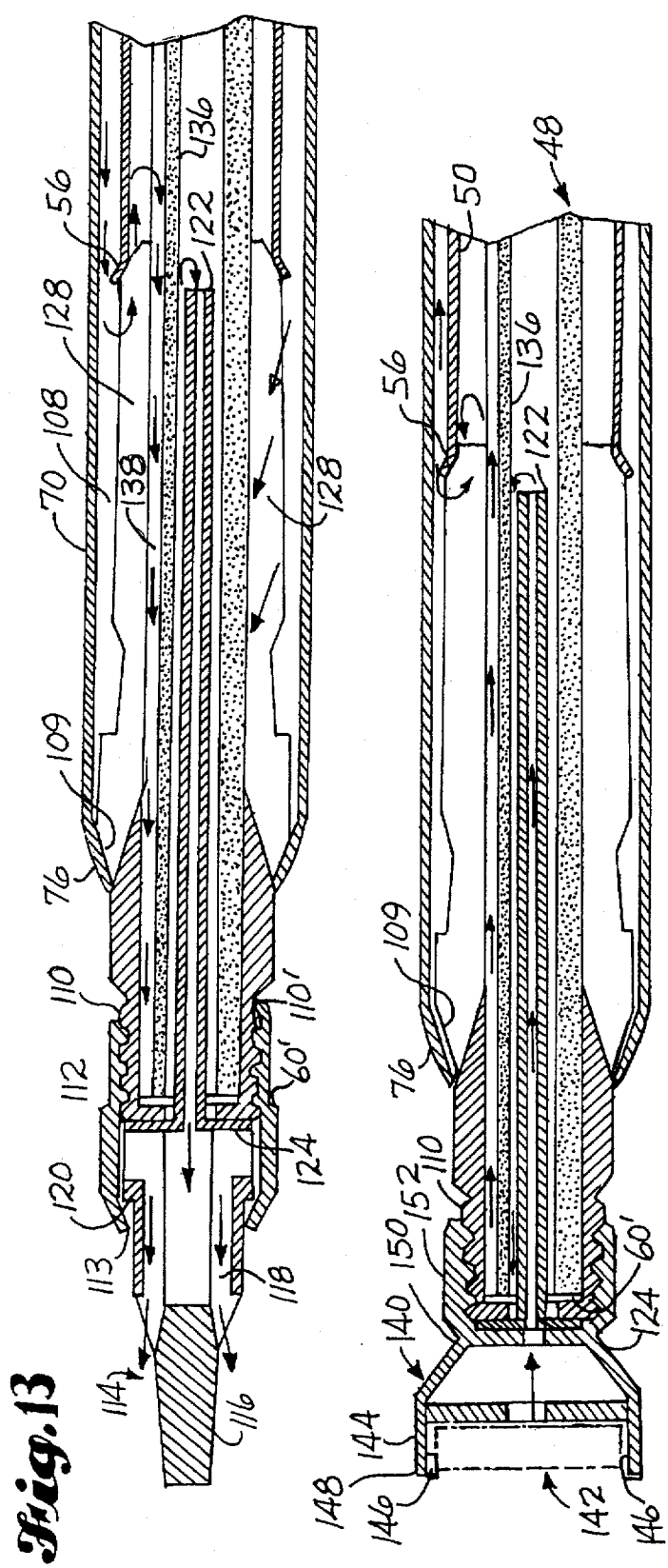
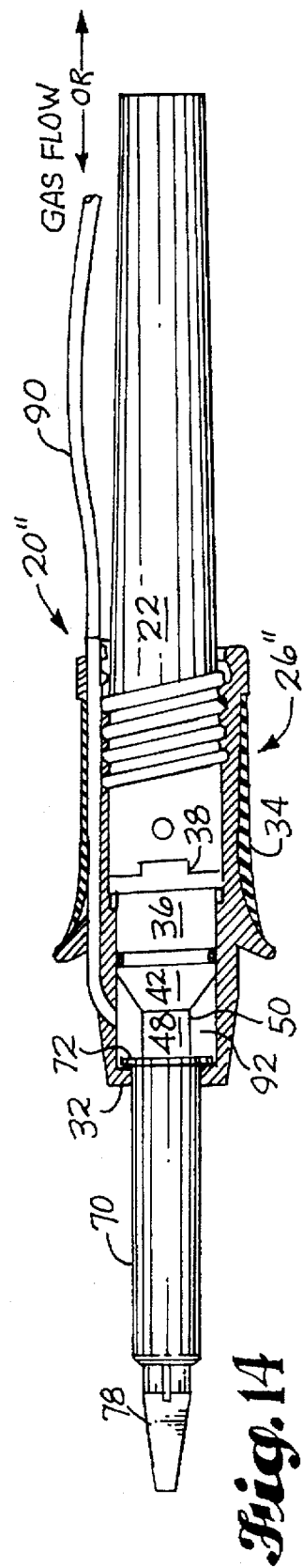

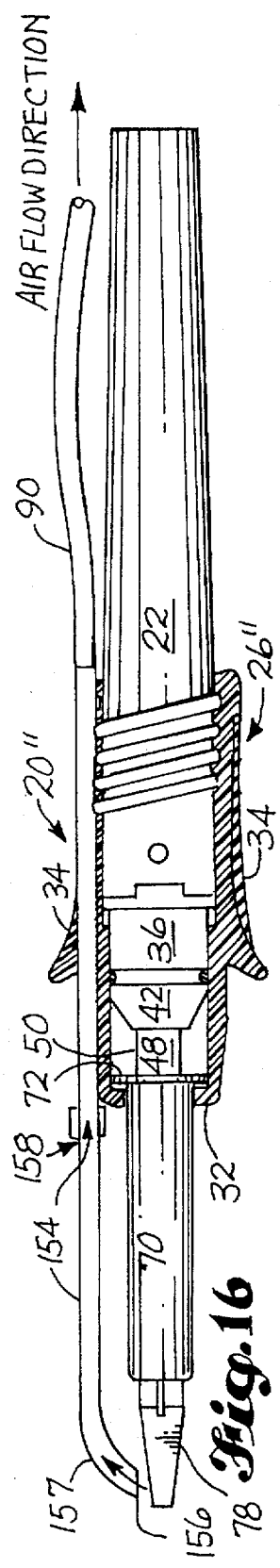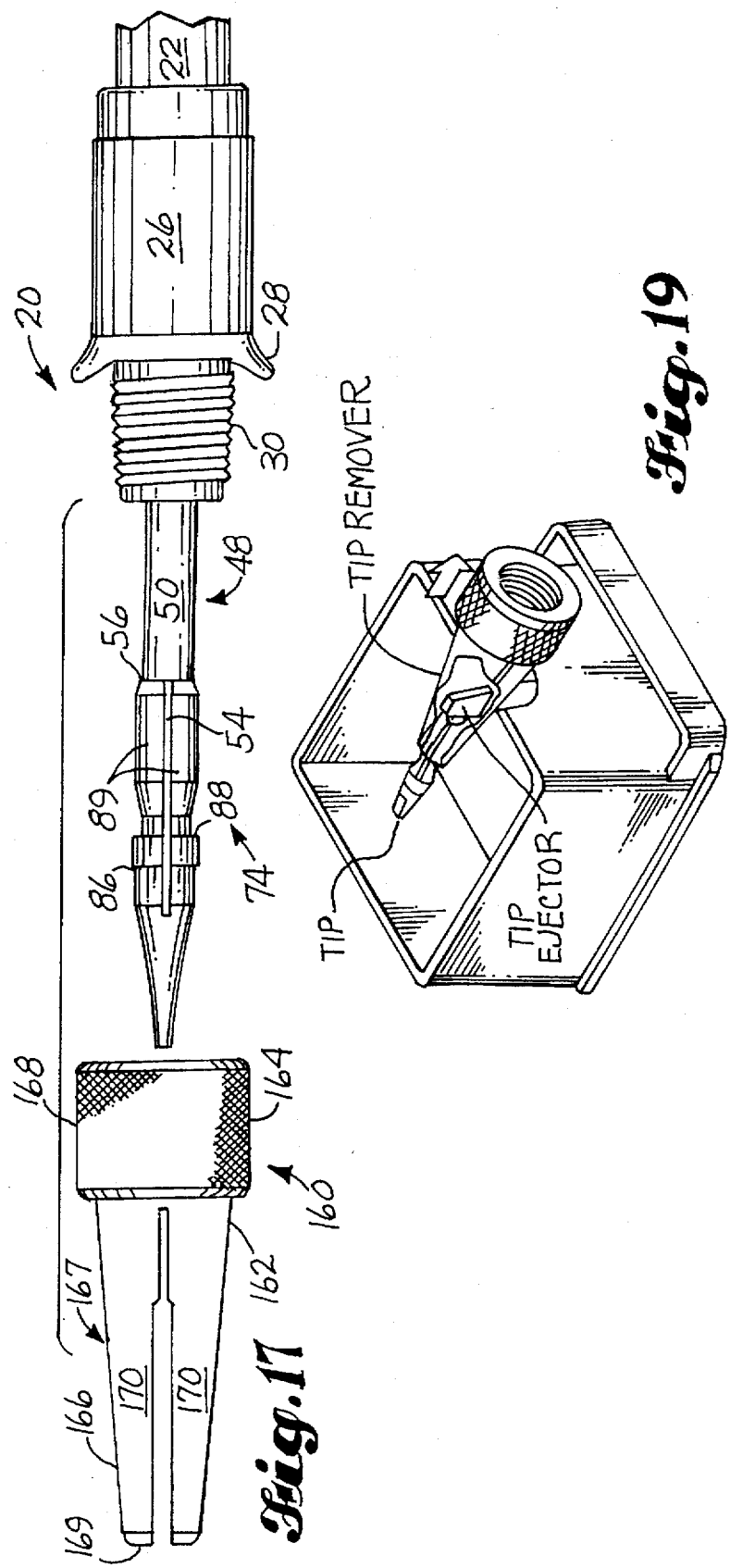

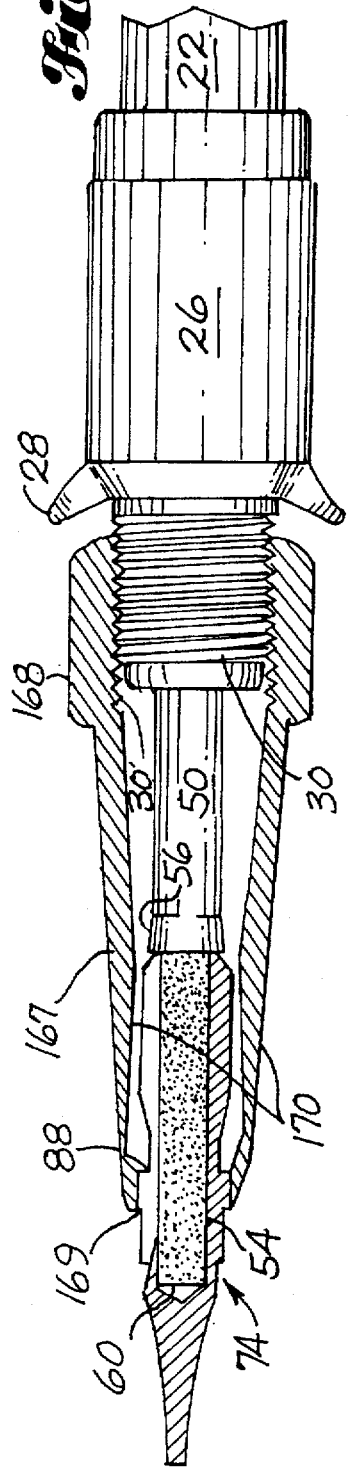
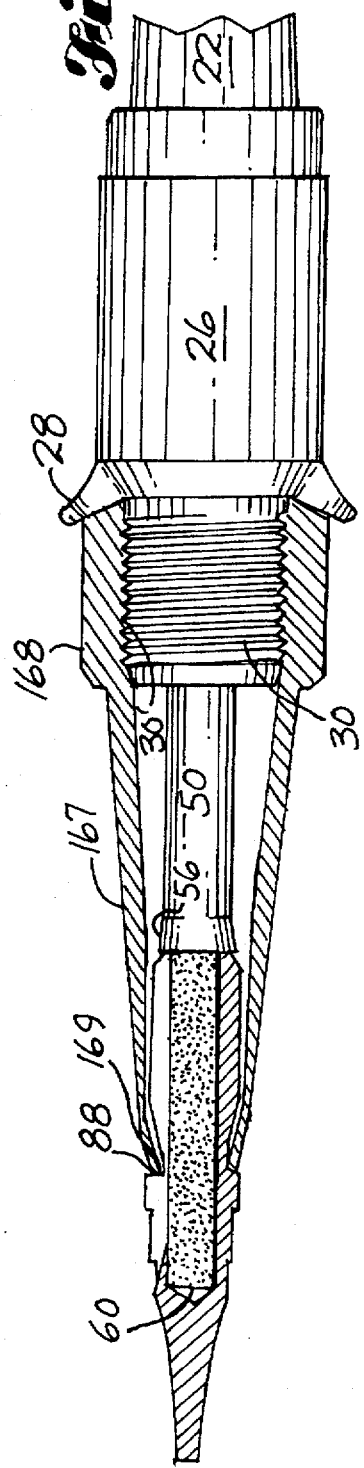
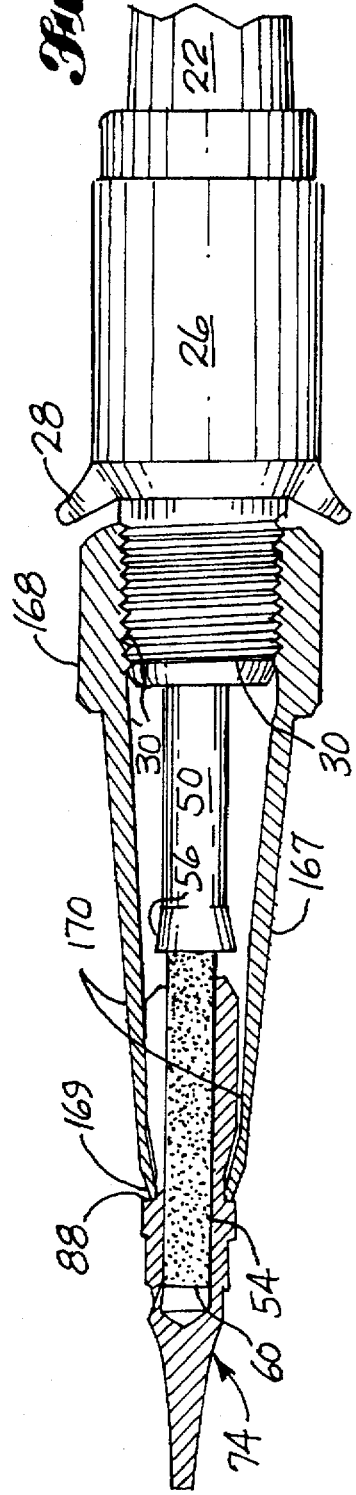

ELECTRIC SOLDERING IRON TIP IMPROVEMENTS

BACKGROUND OF THE INVENTION

This invention relates generally to electrically powered, hand held soldering, or desoldering, tools and more particularly to improvements in their heated tips which either contact the work piece or direct a flow of heated gas thereon. The term "hand held" is intended herein to include robotic applications and "gas" includes ambient air or inert or relatively inert gases such as carbon dioxide, nitrogen, or the like as when undesired chemical action is to be minimized.

In the development of modern, state of the art soldering instruments, many criteria have been exhaustively dealt with including a comfortable and safe handle, ease of operation, low cost to manufacture and maintain, easy parts replacement either for maintenance and repair or for versatility in optimizing its utility for specific, different operations, longevity of the working tip in its severe environment of oxidation and corrosive fumes, and precise temperature control of the working tip with power regulation to maintain a critically important temperature while providing the correct flow of energy to accomplish the soldering or desoldering of costly precision components typical of, for example, modern electronic or computer equipment.

The improvements described and claimed herein are directed primarily to this latter criterion; and their development and background is particularly treated in Applicants' prior patents: HOT AIR SOLDERING AND RESOLDERING SYSTEM— U.S. Pat. No. 4,419,566, HOT AIR HEATED SOLDERING INSTRUMENT—U.S. Pat. No. 4,926,028, HOT GAS SOLDERING SYSTEM—U.S. Pat. No. 5,054,106, REPLACEABLE SOLDERING TIP ASSEMBLY—U.S. Pat. No. 5,059,769, and METALLIC CONDUCTION—HOT GAS SOLDERING—DESOLDERING SYSTEM—U.S. Pat. No. 5,380,982.

It is an object of the present invention to provide a readily removable, replaceable soldering tip which is thermally highly effectively coupled to the heater element and which also promotes a very sensitive temperature control of the working tip relatively independently of the instantaneous temperature of the heater.

It is another object to provide such a soldering tip which permits air flow therethrough in the forward direction for hot gas soldering or in the rearward direction for fume removal form the molten solder area.

It is another object to provide in combination with such soldering tips a tip removing tool for safely and comfortably removing the tip, even if seized to the heater, while not risking damage to the fragile ceramic heater or sensing element.

SUMMARY OF THE INVENTION

Briefly, these objects are achieved in a presently preferred example of the invention in which the soldering tip is of the character having a rear, cylindrical skirt portion which fits over the front end of a cylindrical ceramic heater rod having a thermocouple temperature sensor disposed at its forward tip end and a deposited type of heater element disposed rearwardly thereof. Rearwardly of the deposited heater a metallic sheath is disposed snugly over the ceramic rod and is terminated by an outwardly conically tapered forward end. The skirt portion of the soldering tip is axially slotted along essentially its entire length and its rear is terminated by an inwardly conically tapered end such that when the tip is urged rearwardly over the ceramic rod the inwardly tapered skirt end is retained by the outwardly tapered sheath end whereby the slotted skirt is pressed radially inwardly into a tight thermal coupling with the ceramic rod and its heater. When so disposed, the forward end of the skirt portion is positioned contiguously to the forward end of the ceramic rod and its temperature sensor. The inner diameter the skirt portion is slightly larger than the ceramic rod so that a less than maximum thermal coupling exists between them except where the slotted skirt is forced radially inwardly against the rod and so that the tip may be removed and replaced without damaging the rod and its deposited heater.

The slots, preferably three angularly equally spaced, extend well forwardly of the front end of the skirt causing for their bending a fulcrum forwardly of the temperature sensor tip of the rod. Accordingly, when the soldering tip is urged rearwardly by an outer retaining sleeve, the slotted skirt portions are held in a tight thermal coupling relation with the deposited heater but not with its temperature sensor portion forwardly thereof. This relation provides an effective degree of isolation between the temperature sensor and the heated portions of the skirt while coupling it closer with the forward working portion of the tip.

DESCRIPTIVE LISTING OF THE FIGURES

FIG. 1 is an overall elevational view partially in section and partially schematic of an electric hand held soldering tool embodying improvements of the present invention;

FIG. 2 is an enlarged sectional view of the forward end portion thereof;

FIG. 3 is a prespective view of an example of the soldering tip portion thereof;

FIG. 4 is a cross sectional view thereof taken along the section reference lines 4—4 of FIG. 2;

FIG. 5 is a sectional view of the forward end of a hot air soldering example of the present invention;

FIG. 6 is a sectional view of an alternative hot air soldering example of the invention;

FIG. 7 is an elevational view of a further example of a hot air soldering tip of the invention;

FIG. 8 is a sectional view of the tip of FIG. 7 shown in combination with other portions of the soldering tool;

FIG. 9 is an exploded elevational view of an alternative soldering tip example of the invention;

FIG. 10 is a sectional view of the tip of FIG. 9 shown assembled with other portions of the tool;

FIG. 11 is a sectional view of a further example of a hot air tip according to the present invention;

FIG. 12 is a cross sectional view of the tip of FIG. 11 taken along the section lines 12—12 thereof;

FIG. 13 is a sectional view of a hot air tip embodying a threaded thermal accumulator;

FIG. 14 is an overall elevational view, partially in section, of the soldering tool of FIG. 13;

FIG. 15 is a sectional view of a soldering tip for surface mounted devices and having vacuum lift means;

FIG. 16 is an overall elevational view, partially in section illustrating a fume removal aspect of the invention;

FIG. 17 is an exploded view of a soldering tool and tip of the invention and a tip removal element thereof;

FIGS. 18A,B,C are sectional views illustrating steps in the function of the apparatus of FIG. 17; and FIG. 19 is a perspective view of a tip ejector and collector shown in cooperation with the tip removal tool of FIGS. 17 and 18.

DETAILED DESCRIPTION OF PREFERRED EMBODIMENT

The example of the invention illustrated in FIGS. 1, 2, 3, and 4 includes a soldering tool 20 having a body 22 with large, collar retaining threads 24 formed over its forward central portion. A finger grip collar 26 with mating threads 24' is shown in its normal use disposition over the body 22. Forward of the finger guard rim 28 a second set of threads 30 is formed for holding and operating other elements of the tool combination as described infra. Also formed at the forward end of the collar 26 is a reduced diameter retaining shoulder 32. Along the body of the finger grip collar 26 a tubular layer 34 of soft foam is provided for a cushioned grip for the operator while adding additional thermal insulation from the warm body 22. The collar 26 and the body 20 are preferably molded of a relatively high density plastic.

A heater assembly 36 is "plugged into" the forward end of the body 20 and retained by interlocking keys 38 and a combination dimple-detent 40. The heater assembly includes a base 42 which is supported by its keyed connected to the tool body 20 and by its fit within the inner cylindrical wall 44 of the collar 26. A silicone rubber o-ring 46 provides a snug, removable connection therebetween.

A heater column 48 is cantilevered centrally axially forwardly from the heater assembly base 42 and includes a metallic sheath 50 extending forwardly to a point just rearwardly of a deposited type heater element 52 disposed on the forward central portion of a hollow ceramic heater rod 54. The forward end of the sheath 50 is terminated in an outwardly flared or tapered conical retainer 56. In this example, a thermocouple type of temperature sensor 58 is formed at the forward tip end 60 of the ceramic rod 54. Accordingly, in this example, a pair of electrical signal leads 62 are provided along the length of the ceramic rod 54, through the base 42 and its electrical plug-in with the tool body 20, and thence through the tool and to a control station, not shown, by means of a four-conductor-plus ground cable also not shown. In like manner, a pair of power electrical leads 64 are provided from the heater element 52, through the heater base and the tool body and to the control station through the four conductor cable. In like manner, a positive ground connection 66 to the sheath 50 is carried through the tool by a lead 68 to the external cable.

To summarily complete the description of FIG. 1, it may be noted that the heater assembly 36 is removably affixed to and held axially plugged into the tool body 20 by an outer retaining sleeve 70 having an enlarged diameter flange retaining shoulder 72 at its rear end which is engaged by the retaining shoulder 32 of the collar 26 and which in turn engages a soldering tip 74 by a reduced diameter retaining lip 76 formed at its forward end. Thusly, as will be described in more detail below, when the tip 74, the outer retaining sleeve 70, and the heater assembly 36 are placed together as shown and the finger grip collar 26 is threaded onto the body 22, the soldering tool 20 is securely, but removably, assembled for immediate utilization.

With particular reference to FIGS. 2, 3, and 4, the details of the tip 74 and its cooperation with the sleeve 70, the heater rod 54 and its electrical elements, and the retainer 56 are shown. It is noted that the structure of these figures may be considered to be identical to that of FIG. 1 except that the threads 30 are omitted from the finger grip collar 26'.

The tip 74 includes a soldering point 78 followed by a heater rod encompassing skirt portion 80. The rear of the skirt portion is terminated by an inwardly-rearwardly tapered conical surface 82 adapted to engage the inner conical surface of the retainer 56. The conical surface 82 is preferably knurled with sharp ridges 84 to assure a good grounding connection therebetween and, when the tip is rotated with respect to the retainer 56 while in contact therewith, a cleaning scouring action is achieved further to assure a positive, zero resistance connection.

In the mid portion of the tip 74 an enlarged diameter portion creates two annular retaining shoulders: a forward retaining shoulder 86 for engaging the retaining shoulder 76 of the outer sleeve 70, and a rearward tip removal tool engaging right shoulder 88 whose function will be described infra.

The tip 74 is slotted through the wall of the skirt portion preferably into three angularly equal segments 89 to maximize their strength and thermal capacity. The slots extend well forwardly of the forward end of the skirt portion so that the effective fulcrum for radially bending the skirt segments inwardly is at the forward end of the skirt portion.

The inner diameter of the skin portion is larger than the ceramic heater rod whereby good thermal conductivity therebetween is achieved by radially compressing the skirt segments into contact with the rod; and this is accomplished by urging the tip rearwardly so that its rear tapered surface 82 is thrust inwardly as its rearward displacement is resolved radially inwardly by its engagement with the inner conical surface of the retainer 56. Hence, the heater element 52 is placed in tight thermal connection with the tip while the temperature sensor 58 is not and, accordingly, is significantly more responsive to the soldering point temperature than to that of the heater driven skirt segments.

Referring to FIG. 5, an example of the invention is illustrated in which its structure may be considered to be identical to that of FIG. 2 except that a supply of pressurized gas for hot-air soldering or circuit board pre-heating or fume dispersion is supplied to the tool 20" through a duct 90 which is shown schematically as being carried along the tool body, through finger grip collar 26" and into the annular space 92 between the sheath 50 and the outer sleeve 70. From thence the gas is forced over the skirt segments 89 and through the slots therebetween and finally forwardly and outwardly over the soldering point 78 where, depending upon parameter values determined by the operator, the gas may be used to provide an inert atmosphere for the soldering operation, it may be used for pre-heating the workpiece, it may be used directly for hot-gas soldering, it may be used to divert noxious fumes away or toward a collector fan, or any combination or sequence of such operations.

Referring to FIG. 5 an example of the invention is illustrated in which hot-gas soldering is achieved by forcing the gas through a more tortuous path for increased thermal energy transfer from the heater element to the soldering gas. The structure of the handle, body, and heating assembly as well as the duct 90 and the outer retaining sleeve 70 may be identical to that of the example of FIG. 5. The tip 94, however, may be formed separately from its heat collecting skirt portion 96. The latter may be a simple cylindrical cup thrice slotted for its full length and having a central bore through its otherwise closed front end. The skirt portion's inner diameter again is slightly larger than the outer diameter of the ceramic heater rod 54 and is pressed radially into contact therewith by engagement of its tapered rear end with the retainer 56. The tip 94 proper includes a soldering point 98 followed by an outwardly tapered, conical surface 100 which is engaged by the retaining shoulder 76 of the outer retaining sleeve 70. The soldering point 98 is terminated at its rear by an annular, planar shoulder 102 which is urged axially rearwardly by the threading of the threads 24, 25' as in the above example. The soldering tip 94 is formed with a rearwardly extending tubular portion 103 having a length essentially coextensive with the heater element deposited on the ceramic rod 54. The entire tip 94 is centrally bored to form a hot gas nozzle 104 for directing the soldering gas onto the workpiece.

In operation, pressurized gas is urged through the duct 90, through the annular space between the sheath 50 and the outer retaining sleeve 70, through the slots in the skirt portion 96, inwardly over the front end of the hollow ceramic heating rod, rearwardly along the annular space between the ceramic rod and the tubular portion 103 of the tip 94, and then forwardly out through the central bore nozzle 104.

In FIGS. 7 and 8 a hot air soldering example is illustrated in which there is no heat collector skirt and the soldering tip 106 has the same outer shape as that of the tip 94 but has no central bore. Instead the soldering gas passes over the ceramic rod 54 and directly out forwardly through a deeply straight knurled, at 99, periphery of the conical retaining surface 100' of the soldering point.

In FIGS. 9 and 10 the example shown includes again a two-piece tip and heat accumulator assembly: the slotted skirt portion 108 and the relation of its tapered rear end with the retainer 56 and its retaining shoulder 109 with the retaining shoulder 76 of the outer retaining sleeve 70 is essentially the same as described above in the earlier examples. The front portion of the accumulator skirt portion 108, however, is provided with outer, male threads 110 for the screw-on attachment of a retaining collar 112 having mating internal threads 110' and a reduced diameter forward lip end 113 for holding a soldering tip 114 in place as shown. The tip 114 includes a forward soldering point 116 and a slotted rear body portion 118 with a rear, enlarged diameter portion forming a retaining shoulder 120 to be engaged by the retaining tip 113 of the screw-on collar 112. A hot air heater pipe 122 extends the length of the heater portion of the hollow ceramic rod 54 and is smaller in diameter than the inner diameter thereof. The forward end of the pipe 122 is formed with a flange 124 which extends radially outwardly to the collar 112. The front end of the accumulator skirt portion 108 is centrally bored for the pipe 122 and is otherwise closed.

In operation, gas is fed forwardly into the annular space 126 between the sheath 50 and the outer sleeve 70, through the slots 128 between the skirt segments, forwardly between the front portion of the accumulator and the ceramic rod, over its end 60, rearwardly between the ceramic rod and the pipe 122, and thence forwardly therethrough to the slotted rear body portion 118 of the soldering tip 114. After passing through this tortuous heat collecting path, the gas is directed over the soldering point 116 and forwardly onto the workpiece.

In FIGS. 11 and 12, the hot gas example shown is substantially identical in structure to that of the example shown in FIGS. 9 and 10 except that the screw-on collar and soldering tip are integral and described as follows: a screw-on tip 130 is provided with threads 110" to mate with the threads 110 of the accumulator skirt portion 108. Forwardly of the threads 110", the inner diameter of the threaded tip is reduced to form a retaining shoulder 132 for engaging and retaining the flange 124 of the pipe 122. The front portion of the tip 130 is bored to form a nozzle 133 within which is disposed a flatted needle 134 past which the heated gas may flow in laminar fashion toward the workpiece.

Referring to FIG. 13, an example of the invention is illustrated which is identical to that shown in FIG. 10 except that the ceramic rod is slotted or channeled for the passage of the soldering gas therealong for increased heat transfer to the gas. In this example, the ceramic heating rod 136, before the application of heating element and temperature sensor thereto, is provided with one or more longitudinal channels 138 which extend from rearwardly of the retainer 56 to the forward end 60' of the rod. By this means the soldering gas may flow first rearwardly and then forwardly along the channels 138, thence inwardly over the end 60' of the ceramic rod rearwardly over the pipe 122, forwardly through its center and out over the slotted tip 114.

In the example of FIG. 15 the structure of the tool shown in FIG. 13 is repeated except that a different screw-on tip is illustrated. The tip 140 is particularly adapted for soldering or desoldering surface mounted devices (SMD's) 142 such as computer modules or integrated circuit chips. The tip in this example has the form of a square or rectangular cup 144 which fits over the SMD 142 and engages its terminals 146 along the periphery 148 of the cup. The cup is formed with a reduced diameter end 150 from which extends rearwardly an internally threaded portion 152 for engaging the threads 110 of the accumulator slotted skirt portion 108. Thusly, when the tip 140 is threaded onto the threads 110, the pipe 122 is secured to the assembly and a gas flow passage is created from the SMD 142 to the rear of the heater column 48.

In this example, however, the gas flow is vacuum drawn whereby the soldering tip cup 144 functions as a "suction cup" to draw the SMD off its circuit board as soon as its terminals are desoldered; or, alternatively, the cup may be used to hold and place an SMD for an installation soldering operation until the operator stops the suction and releases the SMD to its desired position on the board.

FIG. 14 illustrates a configuration of the invention like that of FIG. 5 in which it is indicated that the gas flow can be in either direction: positive and forward for the reasons discussed above, or negative and rearward when fume removal is desired.

FIG. 16 illustrates an example of the invention particularly adapted for fume removal: a rigid tube 154 is shown supported along the tool 20 and terminated at its forward open end 156 by a curved portion 157 disposed contiguously to the soldering point 78 of the tip 74. A finger operated slide or rotary collar valve 158 is provided so that, when desired, the operator may permit an adjusted mix of ambient cool air into the duct 90.

Referring to FIG. 17, a tip removal tool 160 is shown in its position when ready to be used to remove the soldering tip 74 from the heater column 48 when it has become seized within the retainer 56 of the sheath 50 against the ceramic heater rod 54, visible in the slots between the skirt segments 89. As in the example of FIG. 1, the soldering tool 20 includes a body 22, a finger grip collar 26 with its guard rim 28 and removal tool threads 30. As will be described in more detail below, the removal tool is a unitary body 162 machined from aluminum, or the like, or molded of a high density plastic. The large diameter, rear end 164 of the tool may be knurled externally for finger gripping for torque as its internal threads are turned onto its mating threads 30. As the tool is thusly threaded rearwardly over the threads 30 the slotted forward tip end 166 is spread over the retaining shoulder 86 until it snaps radially inwardly over the shoulder 88. The tool 160 may then be unthreaded forwardly to push the tip out of engagement with the retainer 56 and free of its seized contact with the ceramic heater rod.

In FIG. 18A these details of structure and action are more clearly illustrated. The body 162 of the tip removal tool 160 is seen to be internally provided with threads 30' at its larger diameter rear, base end 168. The forwardly inwardly conically tapered portion 167 has an axial length such that the tool extends from the front of the finger guard rim 28 to just rearwardly of the retaining shoulder 88 when the tip 74 is installed over the heater column 48 and within the retainer 56. The inner diameter of the forward tip end 169 of the removal tool 160 is less than the outer diameter of the shoulder 88. However, because the forward conical portion of the tool is slotted into a plurality, preferably three, of segments 170, the tip end 169 effectively spreads radially outwardly by being pulled over the shoulder 86 when the tool is turned onto the threads 30. When by this action the tip end 169 snaps over the shoulder 88, the segments return to their quiescent diameter and firmly grasp the body of the soldering tip 74. FIG. 18B illustrates this engaged relation. FIG. 18C then illustrates the forced forward displacement and unseizing of the tip 74 as the removal tool 160 is threaded forwardly along the threads 30.

Referring to FIG. 19, a tip ejector apparatus 172 is shown. When the step illustrated in FIG. 18C is accomplished, the tip 74 is tightly retained within the forward slotted segments 170 of the removal tool and may be dangerously hot. The tip ejector apparatus 172 ejects the tip 74 from the removal tool 160 and retains it safely within a bin 174. The ejector includes the open-at-the-top retainer bin and an ejector vane 176 mounted upwardly from the base 178 of the bin. The vane fits within the slot 171 separating a pair of the segments 170 and engages the rear of the retained soldering tip 74. The removal tool may then be pulled rearwardly as indicated by the motion arrow 180 with a force appropriate to spread the segments 170 and release the tip 74 into the safe confines of the bin 174. To facilitate these steps the rearward side 182 of the bin 174 may be notched by a half port 184 the sill 186 of which provides a stabilizing shelf for the tool 160 while it is being drawn rearwardly to eject the soldering tip 74.

There have thus been disclosed and described a number of examples of the invention which provide the advantages and achieve the objects set forth herein above.

I claim:

1. A soldering tip for a hand held electric soldering iron of the character including a cylindrical heater rod with a predetermined outer diameter and having a forward end and a heating element disposed thereon, the soldering tip being of the character to fit removably over the forward end of the heater rod and its heating element and comprising:
   a body having
      a forward, solder working portion and
      a rear end, hollow cylindrical skirt portion having a rear periphery and an inner diameter slightly larger than that of the cylindrical heater rod, said body being axially slotted to form at least three substantially symmetrical axially extending segments having rear edges and front ends and whose axial length extends from and through said rear end of said body to a point forwardly of said skirt portion and into said forward, solder working portion,
   said rear edges of said segments being tapered inwardly rearwardly about said rear periphery of said skirt portion,
   said body being formed to have an enlarged diameter portion disposed rearwardly of said front ends of said segments,
   said enlarged diameter portion forming a forward retaining shoulder and a rear, remover engaging right shoulder.

2. The invention as set forth in claim 1 in which the number of said segments is three.

3. The invention claimed is an electric soldering iron tool having a soldering tip and tip removal apparatus comprising:
   a tool body having forward end and outer portions and having a first set of external threads formed over part of said outer portion;
   a finger grip collar member having a forward end portion and being disposed over said forward end portion of said tool body and having internal threads mating with said first set of threads and having a second set of external, removal tool engaging threads formed about its said forward end portion, its said forward end portion being terminated by a reduced diameter sleeve retaining lip;
   a heater assembly disposed adjacently forwardly of said body and partially within said collar member and having
      a cylindrical ceramic heater rod extending forwardly from said collar member and having a predetermined outer diameter and having a rear portion carried by said tool body and having central and forward portions, a heater element disposed over at least part of said central and forward portions, and
      a metallic, protective sheath carried by said tool body and having a forward end and being disposed snugly over said rod from its said rear portion to a point axially contiguous to said heater element and being terminated at its said forward end in a flared, outwardly tapered, frusto-conical retaining surface;
   a removable soldering tip having a body with
      a forward, solder working portion, a rear hollow cylindrical skirt portion having a rear edge and an inner diameter slightly larger than said outer diameter of said ceramic heater rod, said tip being disposed over said heater rod forwardly of said frusto-conical retaining surface, said tip body being axially slotted to form at least three substantially symmetrical, axially extending thin walled and axially slotted segments which are radially elastically springable to permit said reduced diameter portion of said forward end of said removal apparatus to pass radially compressively over said enlarged diameter portion of said tip body.

4. The invention as set forth in claim 3 in which the number of said segments of said soldering tip body is three.

* * * * *